INVENTOR.
ROBERT J. MILLS
BY Meyers & Peterson
ATTORNEYS

United States Patent Office 3,305,101
Patented Feb. 21, 1967

3,305,101
UNIVERSAL PORTABLE SADDLE RACK
Robert J. Mills, P.O. Box 312, Forest Lake, Minn. 55025
Filed June 10, 1966, Ser. No. 556,754
6 Claims. (Cl. 211—87)

The present invention relates generally to an improved rack for retaining saddles and the like during the storage thereof, and more particularly to a portable saddle rack which is universally adaptable for retaining and pemitting the rapid drying of the various types of saddles in common use today, such as, for example, western saddles or English saddles.

In the conducting of equestrian activities, it frequently becomes necessary or desirable to provide a portable rack for retaining saddles which is easily set in place, and which is universally adaptable for receiving all types of saddles. The saddle rack of the present invention is preferably designed so that it may be portable, in order to be useful in the various areas where it may be necessary to either permanently or temporarily store a saddle, particularly for the purpose of drying the saddle without losing the shape or form desired therein. In addition, it has been found desirable to permit the maximum flow of air along the support surfaces, thereby increasing the rate at which the moisture is lost from the saddle due to the exposure of a greater amount of saddle area to the ambient atmosphere.

In accordance with the present invention, a universally useful portable saddle rack is provided which is fabricated from tubular rigid support elements and secured together by any desirable means or techniques. The rack, while being formed from rigid tubular materials, employs a pair of support elements with upper and lower longitudinal support rails. These support elements are coupled together in such a manner that they are disposed in downwardly diverging relationship, one to another, the angle of divergency being greater at the rearward end thereof than at the forward end thereof. In addition, in order to render the rack universally mountable, a mounting clamp is arranged at the forward end thereof which includes a pair of substantially inverted "L" shaped brackets each with a downwardly projecting hook element. These hook elements are disposed in outwardly spaced relationship from the forward end of the rack, and form one portion of a clamping means which is adapted to retain the rack in appropriate mounted relationship on a suitable mounting post, rail or the like. The rack is free of any sharp edges or projections.

Therefore, in accordance with the present invention, a universal portable saddle rack is provided which is fabricated from rigid tubular material, and which has a configuration free from any sharp corners, projections or the like.

It is yet a further object of the present invention to provide an improved universal portable saddle rack which is adapted for receiving either western or English saddles in properly positioned disposition thereon.

It is yet a further object of the present invention to provide an improved universal portable saddle rack which has a mounting clamp at the forward end thereof, the mounting clamp being universally adaptable for mounting on the ordinarily encountered rails, posts and the like.

It is yet a further object of the present invention to provide an improved universally portable saddle rack which has a skeleton frame which provides a maximum of support for a saddle, and which is substantially open in structure so as to permit free flow of atmospheric air to the outer surface of the saddle and more importantly to the under surface thereof.

Other and further objects of the present invention will become apparent to those skilled in the art upon a study of the following specification, appended claims and accompanying drawing wherein:

Figure 1:
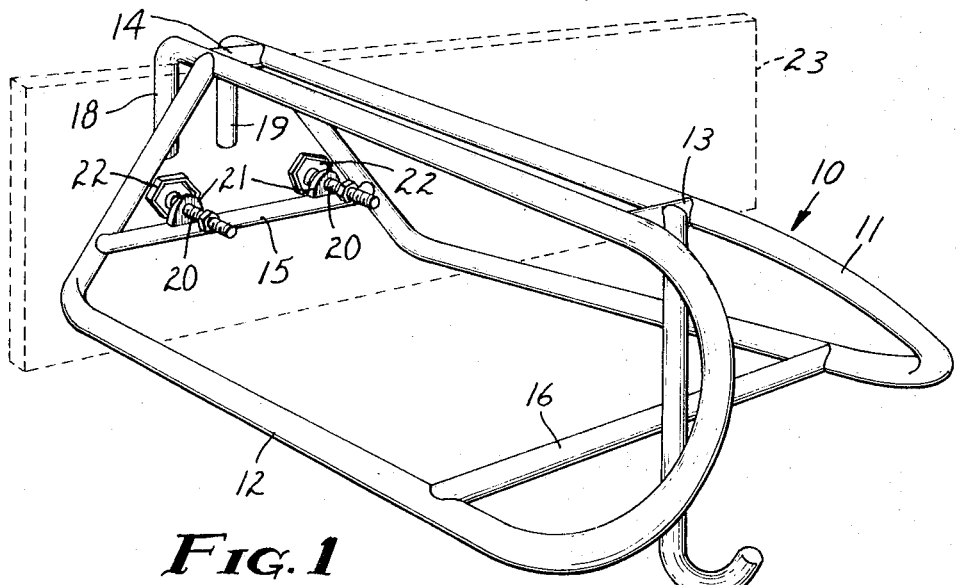
FIGURE 1 is a perspective view of a saddle rack prepared in accordance with the present invention, and showing in phantom a fence rail to which the rack may be conveniently attached.
Figure 2:
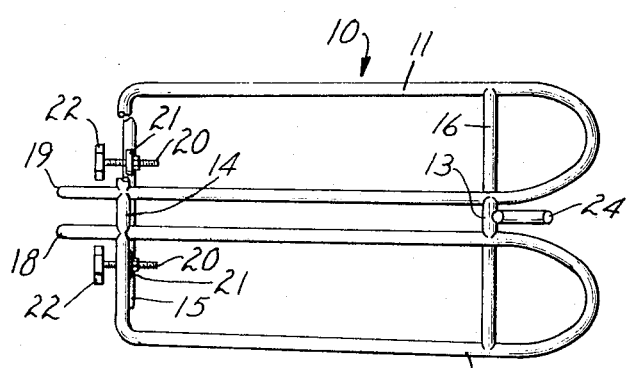
FIGURE 2 is a top plan view of the rack shown in FIGURE 1, FIGURE 2 being on a somewhat reduced scale, and showing a portion of the rack broken away.
Figure 3:
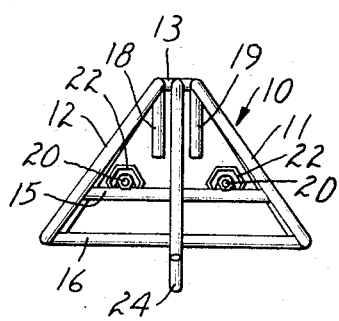
FIGURE 3 is a rear elevational view of the rack as shown in FIGURE 2.
Figure 4:
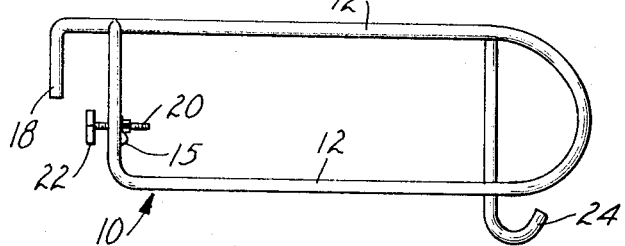
FIGURE 4 is a side elevational view of the rack as illustrated in FIGURE 2.

In accordance with the preferred modification of the present invention, the universal portable saddle rack generally designated 10 is prepared or fabricated from a pair of downwardly diverging support elements 11 and 12 which are coupled together along their upper support rails by the tie-rails 13 and 14. The support elements 11 and 12 are further secured together by the transverse braces 15 and 16, as best illustrated in FIGURE 1. At the forward end of the saddle rack, a mounting clamp is shown, this clamp including a pair of substantially inverted L shaped brackets forming a pair of downwardly projecting hook elements 18 and 19, these hook elements being disposed outwardly of and in spaced relationship from the forward end of the rack. Cooperating with the hook elements, and forming a portion of the mounting clamps are a pair of threaded members 20—20 received in threadably engaged relationship with the tapped ears 21—21 and having a pair of clamping heads 22—22 secured to the outer free ends thereof. These heads move generally normal to the legs of the L shaped inverted brackets. As illustrated in FIGURE 1, the rack is shown attached to the rail member 23, the rail 23 being shown in phantom in FIGURE 1. This is the type of rail or post structure which is frequently found available in areas where horses are being prepared for riding, or where the saddles are being removed.

In order to accommodate the bridle and thus keep it off the surface of the floor or ground in the area where the saddle rack is being utilized, a substantially J shaped hook member 24 is provided at the rearward end of the rack. This hook is secured to the tie members 13 and 16, and is conveniently available for supporting the bridle in a desired manner.

Generally, a western type saddle will be best positioned for drying with its forward end toward the forward end of the rack. An English type saddle rests upon the rack better when placed thereon in a reversed position.

It will be appreciated, therefore, that the saddle rack of the present invention comprises a substantially open tubular support frame member which utilizes a minimum of support surface together with a maximum of exposed saddle area. In addition, it will be appreciated that the rack is provided with a mounting clamp at the forward end thereof which is universally adaptable for mounting in any convenient location, and particularly in the types of surfaces frequently found in the area where horses are being utilized. The clamping means which are threadably engaged with the rack are held at a sufficiently close point to the top of the rack so as to render the rack more universally mountable, and furthermore, are disposed inwardly from the outer surface thereof so as to render the rack less cumbersome, and space consuming.

It will, of course, be understood that various changes may be made in the form, details, arrangements and proportions of the parts without departing from the scope of my invention as set forth in the appended claims.

I claim:
1. Saddle rack means for supporting a riding saddle or the like during storage thereof, said rack comprising:
    (a) a pair of angularly disposed downwardly diverging rigid support elements secured together in spaced relationship by at least one tie-rail adjacent the top surface thereof;
    (b) each of said tubular support elements having upper and lower longitudinal support rails extending from the forward end to the rearward end of said rack, and being joined together by an arcuately formed semicircular coupling segment at the rearward end; and
    (c) a mounting clamp including a substantially inverted L-shaped bracket with a pair of downwardly projecting hook elements disposed outwardly of and spaced relationship from the said forward end, and clamping means along said forward end arranged for movement toward and away from said hook elements.

2. The saddle rack as defined in claim 1 being particularly characterized in that said support elements are fabricated from rigid tubular members.

3. The saddle rack as defined in claim 1 being particularly characterized in that the diverging angle between the two rigid support elements is greater at the rearward end of said rack than the forward end thereof.

4. The saddle rack as defined in claim 1 being particularly characterized in that said rack is provided with a bridle retaining hook therein.

5. The saddle rack as defined in claim 1 being particularly characterized in that said mounting clamp is disposed and arranged to retain said rack in cantilever supporting relationship.

6. The saddle rack as defined in claim 1 being particularly characterized in that said clamping means includes a pair of threaded clamping members which are arranged along a transverse bracket between the outer surfaces of the said rigid support elements.

References Cited by the Examiner

UNITED STATES PATENTS

| | | | |
|---|---|---|---|
| 381,776 | 4/1888 | Harbison | 211—87 |
| 2,952,366 | 9/1960 | Botten | 211—104 |
| 3,233,745 | 2/1966 | Hershberger | 211—104 |

CLAUDE A. LE ROY, *Primary Examiner.*